United States Patent
Ise et al.

(10) Patent No.: US 10,096,826 B2
(45) Date of Patent: Oct. 9, 2018

(54) ACTIVE MATERIAL, NONAQUEOUS ELECTROLYTE BATTERY, BATTERY PACK, AND METHOD OF PRODUCING ACTIVE MATERIAL

(71) Applicant: KABUSHIKI KAISHA TOSHIBA, Minato-ku (JP)

(72) Inventors: Kazuki Ise, Fuchu (JP); Yorikazu Yoshida, Yokohama (JP); Yasuhiro Harada, Yokohama (JP); Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 205 days.

(21) Appl. No.: 14/061,168

(22) Filed: Oct. 23, 2013

(65) Prior Publication Data
US 2014/0120404 A1    May 1, 2014

(30) Foreign Application Priority Data
Oct. 26, 2012  (JP) .................................. 2012-236687

(51) Int. Cl.
*H01M 4/485* (2010.01)
*H01M 4/131* (2010.01)
*H01M 10/052* (2010.01)

(52) U.S. Cl.
CPC ............ *H01M 4/485* (2013.01); *H01M 4/131* (2013.01); *H01M 10/052* (2013.01)

(58) Field of Classification Search
CPC ................................................... H01M 6/14
See application file for complete search history.

(56) References Cited

U.S. PATENT DOCUMENTS

| | | | | |
|---|---|---|---|---|
| 6,316,145 B1* | 11/2001 | Kida | ....................... | H01M 4/48 429/218.1 |
| 2012/0052401 A1* | 3/2012 | Goodenough | ......... | C01G 33/00 429/341 |
| 2012/0122019 A1* | 5/2012 | DiSalvo, Jr. | ........... | B82Y 30/00 429/524 |

FOREIGN PATENT DOCUMENTS

| | | | |
|---|---|---|---|
| CN | 102544466 A | 7/2012 | |
| CN | 102694160 A | 9/2012 | |
| JP | 2010-287496 | 12/2010 | |
| JP | 2010287496 A * | 12/2010 | ............ H01M 10/05 |
| JP | 2012-99287 | 5/2012 | |
| JP | 2012-166966 A | 9/2012 | |
| WO | WO 2012/016185 A2 | 2/2012 | |

OTHER PUBLICATIONS

Translation of JP20100287496.*

(Continued)

*Primary Examiner* — Sarah A. Slifka
*Assistant Examiner* — Brian R Ohara
(74) *Attorney, Agent, or Firm* — Oblon, McClelland, Maier & Neustadt, L.L.P.

(57) ABSTRACT

According to one embodiment, an active material containing a niobium titanium composite oxide is provided. The niobium titanium composite oxide has average composition represented by $Li_yNb_{2+x}Ti_{1-x}O_{7+0.5x}$ ($0 \le x \le 0.5$, $0 \le y \le 5.5$). The niobium titanium composite oxide satisfies peak intensity ratios represented by the following formulae (1) to (3):

$$0.05 \le (B/A) \le 0.7 \quad (1)$$

$$0.01 \le (C/A) \le 0.2 \quad (2)$$

$$0 \le (D/A) \le 0.1 \quad (3).$$

20 Claims, 7 Drawing Sheets

(56) References Cited

OTHER PUBLICATIONS

Ismail "Sintering temperature effect on density, structural and morphological properties of Mg- and Sr- doped ceria" 2016 Journal of Taibah University for Science, vol. 10 pp. 381-385 (Year: 2016).*
Inoue "The relationship between crystal morphology and XRD peak intensity on $CaSO_4.2H_2O$" 2013, Elsevier, vol. 310, pp. 169-175 (Year: 2016).*
Madeleine Gasperin, "Affinement de la structure de $TiNb_2O_7$ et repartition des cations", Journal of Solid State Chemistry, 53, 1984, 2 pages.
Combined Chinese Office Action and Search Report dated Jul. 1, 2015 in Patent Application No. 201310511578.9 (with English language translation).
Office Action dated Feb. 24, 2016 in Chinese Patent Application No. 201310511578.9 with English translation.
Office Action dated Jun. 21, 2016, in corresponding Japanese Patent Application No. 2013-223762 (with machine-translated English-language Translation—no representation is made as to its accuracy—Resource: *Global Dossier*, Jun. 29, 2016).

\* cited by examiner

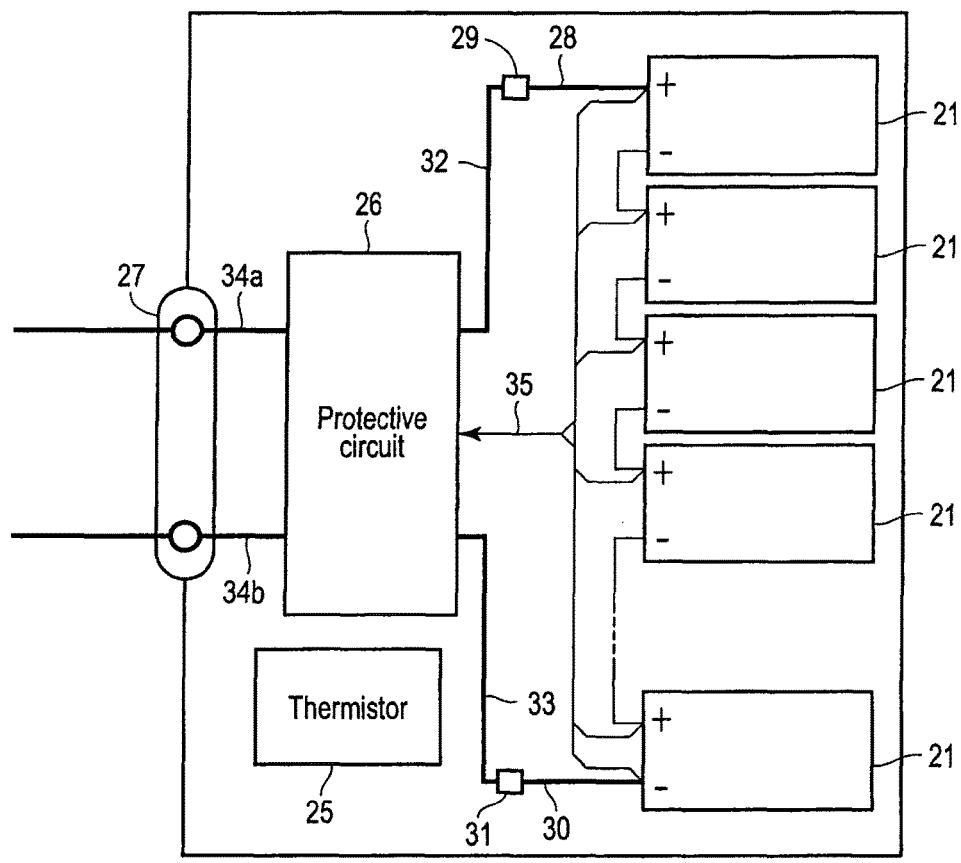
F I G. 6

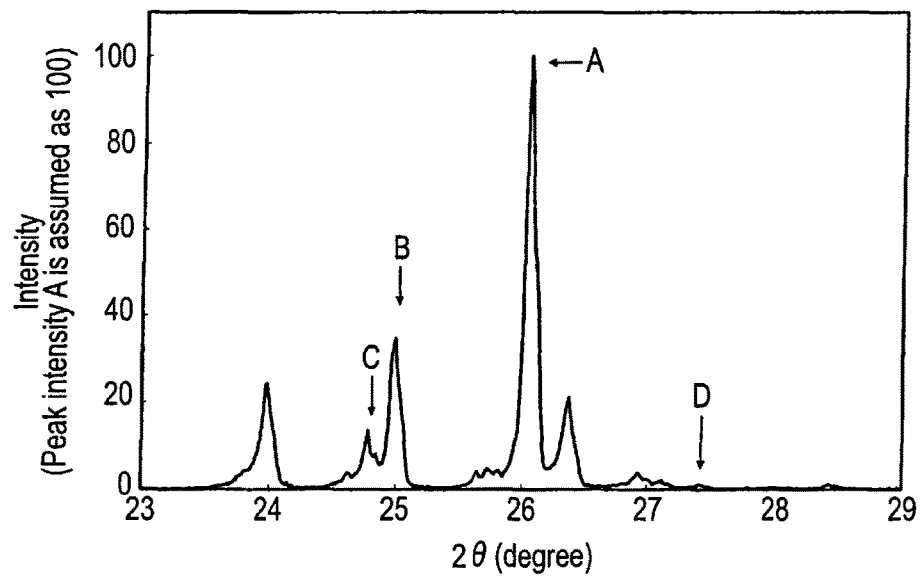
F I G. 7
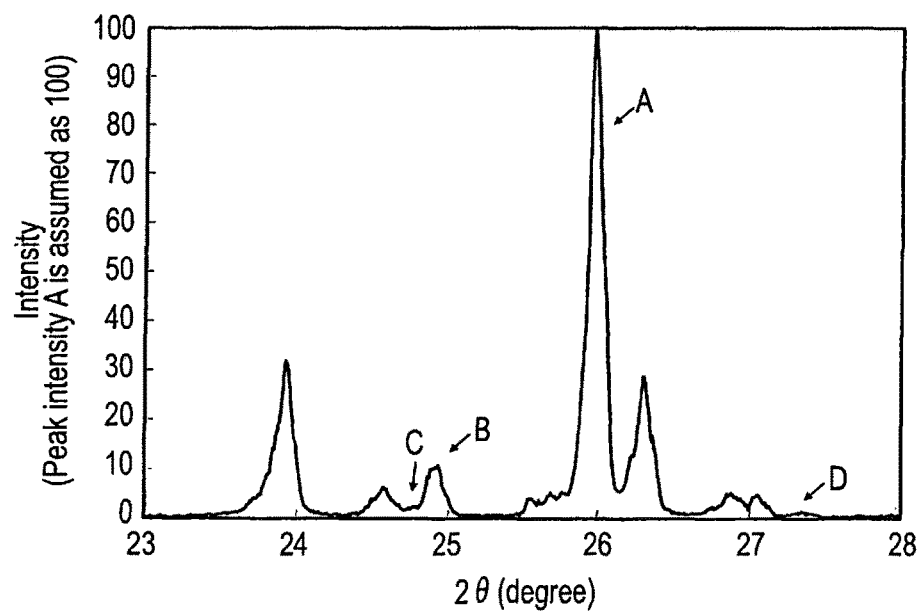
F I G. 8

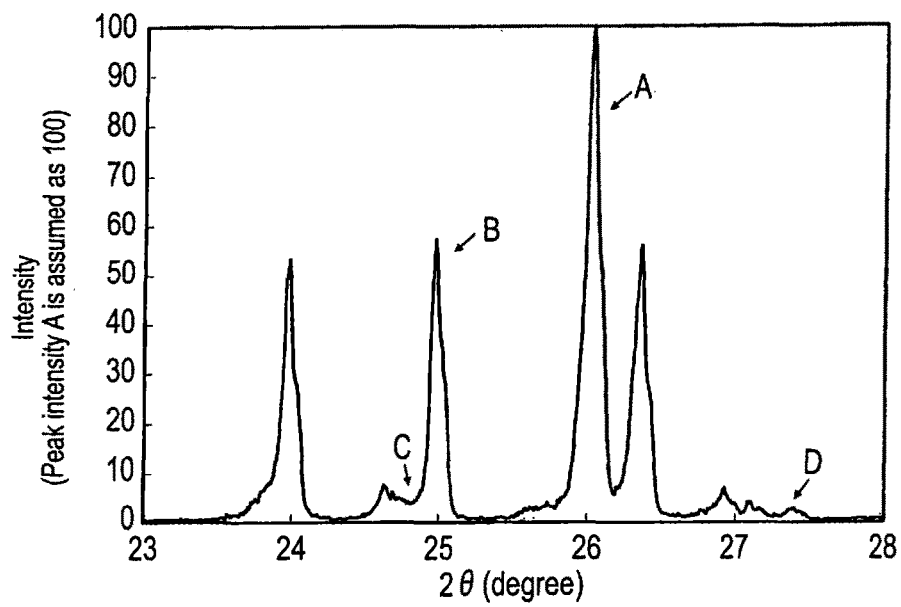
F I G. 9
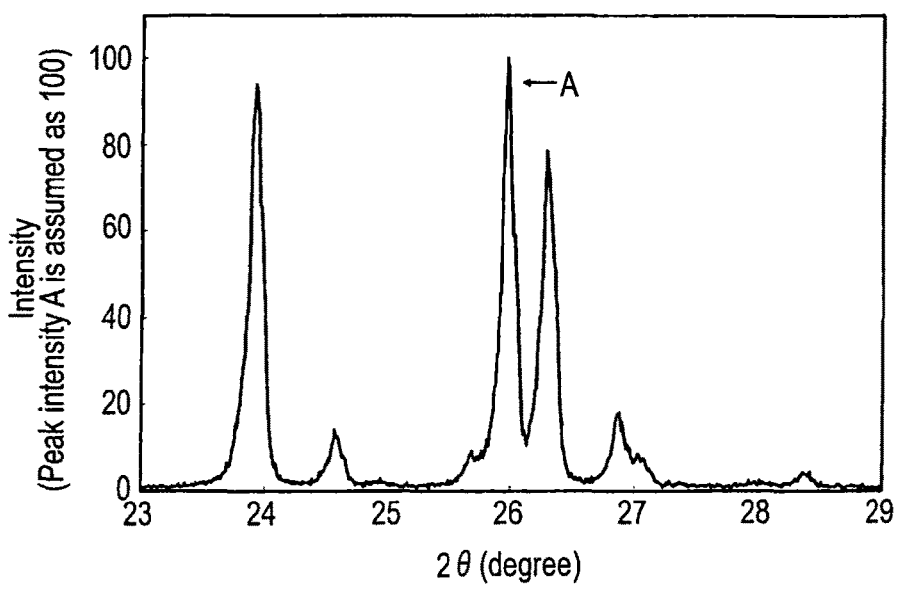
F I G. 10

US 10,096,826 B2

ACTIVE MATERIAL, NONAQUEOUS ELECTROLYTE BATTERY, BATTERY PACK, AND METHOD OF PRODUCING ACTIVE MATERIAL

CROSS-REFERENCE TO RELATED APPLICATIONS

This application is based upon and claims the benefit of priority from Japanese Patent Application No. 2012-236687, filed Oct. 26, 2012, the entire contents of which are incorporated herein by reference.

FIELD

Embodiments described herein relate generally to an active material, a nonaqueous electrolyte battery, a battery pack, and a method of producing an active material.

BACKGROUND

In a niobium titanium composite oxide such as $Nb_2TiO_7$, when Li is inserted, Nb is charge-compensated (from plus-pentavalent to plus-trivalent) and Ti is charge-compensated (from plus-quadrivalent to plus-trivalent). Thus, it has a high theoretical capacity of 387.6 mAh/g. Consequently, the niobium titanium composite oxide is expected to replace $Li_4Ti_5O_{12}$ as a high capacity material; however, the rate performance is low. Generally, Nb-rich niobium titanium composite oxides, such as $Nb_{10}Ti_2O_{29}$ and $Nb_{24}TiO_{62}$ are excellent in lithium absorption and release characteristics as compared with $Nb_2TiO_7$. However, the content ratio of Nb increases, which leads to an increase in cost.

BRIEF DESCRIPTION OF THE DRAWINGS

FIG. 6 is a block diagram showing an electric circuit of the battery pack of FIG. 5;

FIG. 7 shows an X-ray diffraction pattern of a niobium titanium composite oxide of Example 1;

FIG. 8 shows an X-ray diffraction pattern of a niobium titanium composite oxide of Example 2;

FIG. 9 shows an X-ray diffraction pattern of a niobium titanium composite oxide of Example 3;

FIG. 10 shows an X-ray diffraction pattern of a niobium titanium composite oxide of Comparative example 1.

DETAILED DESCRIPTION

Figure 1:
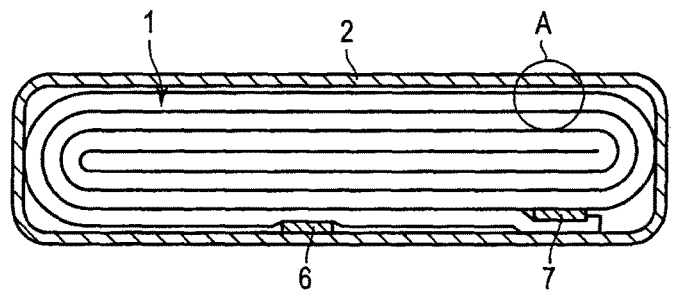
FIG. 1 is a cross-sectional view of a flat-shaped nonaqueous electrolyte battery according to a first embodiment.

According to one embodiment, there is provided an active material containing a niobium titanium composite oxide. The active material has average composition represented by $Li_yNb_{2+x}Ti_{1-x}O_{7+0.5x}$ (0≤x≤0.5, 0≤y≤5.5). The niobium tita-nium composite oxide satisfies peak intensity ratios represented by the following formulae (1) to (3):

$$0.05 \leq (B/A) \leq 0.7 \quad (1)$$

$$0.01 \leq (C/A) \leq 0.2 \quad (2)$$

$$0 \leq (D/A) \leq 0.1 \quad (3)$$

A is an intensity of peak derived from $Nb_2TiO_7$ and appeared at 2θ of 26.0±0.1° in a wide angle X-ray diffraction pattern using CuKα rays as an X-ray source. B is an intensity of peak derived from $Nb_{10}Ti_2O_{29}$ and appeared at 2θ of 25.0±0.1° in the diffraction pattern. C is an intensity of peak derived from $Nb_{24}TiO_{62}$ and appeared at 2θ of 24.8±0.1° in the diffraction pattern. D is an intensity of peak derived from a $TiO_2$ rutile phase and appeared at 2θ of 27.4±0.2° in the diffraction pattern.

According to the embodiments, there is provided a nonaqueous electrolyte battery including a positive electrode, a negative electrode, and a nonaqueous electrolyte. The negative electrode contains the active material according to the embodiments.

According to the embodiments, there is provided a battery pack including the nonaqueous electrolyte battery according to the embodiments.

According to one embodiment, there is provided a method of producing an active material including: first sintering a mixture containing $TiO_2$ particles and $Nb_2O_5$ particles having an average particle diameter smaller than that of the $TiO_2$ particles at 600° C. to 1100° C.; and second sintering the mixture at 1300° C. to 1400° C. to obtain oxide.

Hereinafter, the embodiments will be described with reference to the drawings. The same reference numerals denote common portions throughout the embodiments and an overlapped description is not repeated. Each drawing is a pattern diagram to facilitate the description of the embodiments and its understanding. The shape, size, and ratio thereof are different from those of an actual device. However, they can be appropriately designed and modified by taking into consideration the following description and known techniques.

First Embodiment

An active material according to a first embodiment contains a niobium titanium composite oxide whose average composition is represented by $Li_yNb_{2+x}Ti_{1-x}O_{7+0.5x}$ (0≤x≤0.5, 0≤y≤5.5). The niobium titanium composite oxide is present as a mixed phase of phases having different composition ratios of Nb/Ti or a mixed phase of a phase having a different composition ratio of Nb/Ti and a $TiO_2$ rutile phase. An elemental ratio which represents these mixed phases as a whole is an average composition. The average composition of Nb and Ti elements can be quantified by, for example, ICP emission spectrometry. The average composition of an O element can be quantified by, for example, inert gas fusion-infrared absorptiometry. However, it is difficult to accurately quantify the average composition of the O element because of principle of the measurement device and the influence of impurities such as moisture and an organic compound which are adhered to the surface. Therefore, when the average composition is represented by $Li_yNb_{2+x}Ti_{1-x}O_{7+0.5x}$ (0≤x≤0.5, 0≤y≤5.5), an error range of the concentration of oxygen is ±0.3. The reason why the range of x is set to 0≤x≤0.5 is that if x exceeds 0.5, a ratio of a subphase such as $Nb_{10}Ti_2O_{29}$ or $Nb_{24}TiO_{62}$ is increased based on a main phase of $Nb_2TiO_7$ and the amount of lithium inserted is decreased. The reason why the range of y is set to 0≤y≤5.5 is that if y exceeds 5.5, more than a theoretical capacity of lithium is contained and battery characteristics are reduced by the excessive insertion of lithium.

The niobium titanium composite oxide satisfies peak intensity ratios represented by the following formulae (1) to (3):

$$0.05 \leq (B/A) \leq 0.7 \quad (1)$$

$$0.01 \leq (C/A) \leq 0.2 \quad (2)$$

$$0 \leq (D/A) \leq 0.1 \quad (3)$$

A is an intensity of peak derived from $Nb_2TiO_7$ and appeared at 2θ of 26.0±0.1° in a wide angle X-ray diffraction pattern using CuKα rays as an X-ray source. B is an intensity of peak derived from $Nb_{10}Ti_2O_{29}$ and appeared at 2θ of 25.0±0.1° in the wide angle X-ray diffraction pattern. C is an intensity of peak derived from $Nb_{24}TiO_{62}$ and appeared at 2θ of 24.8±0.1° in the wide angle X-ray diffraction pattern. D is an intensity of peak derived from a $TiO_2$ rutile phase and appeared at 2θ of 27.4±0.2° in the wide angle X-ray diffraction pattern.

The peak intensity A represents an intensity of peak derived from anisotropically-grown $Nb_2TiO_7$ crystallites. If the peak intensity ratio (B/A) is less than 0.05 or the peak intensity ratio (C/A) is less than 0.01, the Nb rich phase is insufficient. Thus, lithium absorption and release characteristics are deteriorated and the discharge capacity and rate performance are reduced. If the peak intensity ratio (B/A) exceeds 0.7 or the peak intensity ratio (C/A) exceeds 0.2, the production cost of the active material becomes high and the capacity (lithium absorption and release characteristics) of the active material is reduced. The range of the peak intensity ratio (B/A) is more preferably from 0.06 to 0.5. The range of the peak intensity ratio (C/A) is more preferably from 0.01 to 0.1.

The $TiO_2$ rutile phase can improve the electric conductivity during the insertion of lithium. The intensity D of the peak derived from the $TiO_2$ rutile phase allows the electric conductivity of the active material to be improved. However, if the peak intensity ratio (D/A) exceeds 0.1, the capacity of the active material is decreased. Accordingly, the peak intensity ratio (D/A) is preferably 0.1 or less (0 is included). The range of the peak intensity ratio (D/A) satisfies more preferably 0<(D/A)≤0.1, still more preferably 0.005≤(D/A)≤0.1.

When the niobium titanium composite oxide having the above range of the average composition and peak intensity ratio contains Nb rich phases (such as $Nb_{10}Ti_2O_{29}$ and $Nb_{24}TiO_{62}$) which can produce lithium absorption and release characteristics more excellent than those of $Nb_2TiO_7$, the electrical conductivity is increased. Thus, high lithium absorption and release characteristics can be achieved. When the $TiO_2$ rutile phase is included, the insertion of Li into the $TiO_2$ rutile phase is started at an early stage. Thus, lithium absorption and release characteristics of the niobium titanium composite oxide can be further improved. Nb whose raw material cost is higher than that of Ti. However, it is possible to contain an Nb rich phase in which the content ratio of Nb is not increased. Accordingly, it is possible to obtain an active material which reduces costs and has high capacity and excellent lithium absorption and release characteristics.

Here, a wide-angle X-ray diffraction measurement method will be described. A sample being measured is ground until its average particle diameter becomes about 10 μm. As a sample stand, for example, a glass sample plate with a holder portion having a depth of 0.2 mm is used. The holder portion is filled with the sample, and the sample is flattened by sufficiently pressing a glass plate to the sample. The glass sample plate filled with the sample is measured on a powder X-ray diffractometer using Cu-Kα radiation.

As for the average composition of the active material, for example, the average composition of Nb and Ti elements can be quantified by ICP emission spectrometry. The average composition of an O element can be quantified by inert gas fusion-infrared absorptiometry.

In the synthesis of the active material, it is preferable to use, for example, a solid phase synthesis method using $Nb_2O_5$ and $TiO_2$ as starting materials. The average particle diameter of $Nb_2O_5$ particles as the starting materials is preferably smaller than that of $TiO_2$ particles. More preferably, the average particle diameter of $Nb_2O_5$ particles is 1 μm or less and the average particle diameter of $TiO_2$ particles is 4 μm or more. Thus, when there is a difference in particle diameter between $Nb_2O_5$ particles and $TiO_2$ particles, atomic diffusion during sintering in the solid phase method is not sufficiently activated. The use of this phenomenon allows an Nb rich phase such as $Nb_{10}Ti_2O_{29}$ or $Nb_{24}TiO_{62}$ or a $TiO_2$ rutile phase to be intentionally formed. As the average particle diameter for $Nb_2O_5$ particles and $TiO_2$ particles, a particle diameter when the volume frequency is 50% is used. The average particle diameter can be measured with a laser diffraction and scattering-type particle size distribution measuring device.

In the synthesis by the solid phase method, it is possible to perform temporary sintering as the first sintering before the sintering. The temporary-sintering temperature is preferably from 600° C. to 1100° C. A small amount of impurity components (e.g., water and an organic compound) which are adhered to the raw material powder can be removed by the temporary sintering.

In the synthesis by the solid phase method, the sintering temperature as the second sintering is preferably from 1300 to 1400° C., more preferably 1350° C. The sintering temperature is set to the range of 1300 to 1400° C., whereby the grain growth of crystallites in the plane direction of the peak appearing at 2θ of 26.0±0.1° progresses. Thus, if the crystallites anisotropically grow, a binding interface between the Nb-rich phase and the $Nb_2TiO_7$ phase can be formed smoothly. When the sintering is performed at a temperature lower than 1300° C., the anisotropic grain growth does not progress. Further, when the sintering is performed at a temperature exceeding 1400° C., diffusion of Nb and Ti elements progresses rapidly. Accordingly, the composition of the material becomes homogeneous easily, and it becomes difficult to form a mixed phase with an Nb-rich phase such as $Nb_{10}Ti_2O_{29}$ or $Nb_{24}TiO_{62}$.

Annealing the oxide can be performed after the sintering. The annealing temperature is preferably from 600° C. to 1000° C. If the annealing is performed in the temperature range, the Nb rich phase can be reduced.

Rapid cooling the oxide can be performed after the sintering. As a result, the Nb rich phase can be increased.

The impurity phase contained may be an Nb-rich phase having a ratio of Nb to Ti (Nb/Ti composition ratio) higher than those of $Nb_{10}Ti_2O_{29}$, $Nb_{24}TiO_{62}$, and $Nb_2TiO_7$. The $TiO_2$ rutile phase is preferred since the improvement in electric conductivity during the insertion of Li can be expected. Even when only the Nb-rich phase is contained, the improvement in lithium absorption and release characteristics can be expected. Thus, it is not necessary that the phases are mixed. The amount of the impurity phase can be appropriately adjusted depending on the particle diameter and sintering condition of the starting materials.

According to the active material of the first embodiment as described above, it is possible to obtain an active material having a high capacity and excellent lithium absorption and release characteristics because the active material contains a niobium titanium composite oxide whose average composition is represented by $Li_yNb_{2+x}Ti_{1-x}O_{7+0.5x}$ ($0 \leq x \leq 0.5$, $0 \leq y \leq 5.5$) and which satisfies peak intensity ratios represented by the formulae (1) to (3). According to the method of producing an active material of the first embodiment, there can be provided an active material having a high capacity and excellent lithium absorption and release characteristics because the method includes first sintering a mixture containing $TiO_2$ particles and $Nb_2O_5$ particles having an average particle diameter smaller than that of the $TiO_2$ particles at 600° C. to 1100° C.; and second sintering the mixture at 1300° C. to 1400° C.

Second Embodiment

A nonaqueous electrolyte battery according to a second embodiment includes a positive electrode, a negative electrode containing the active material according to the first embodiment, and a nonaqueous electrolyte. The nonaqueous electrolyte battery further includes a separator disposed between the positive electrode and the negative electrode; and a case which houses the positive and negative electrodes, the separator, and the nonaqueous electrolyte.

Hereinafter, the positive electrode, the negative electrode, the nonaqueous electrolyte, the separator, and the case will be described in detail.

1) Negative Electrode

The negative electrode includes a current collector and a negative electrode active material containing layer (negative electrode material layer). The negative electrode active material containing layer is formed on one side or both sides of the collector. The layer includes the active material and arbitrarily includes the conductive agent and the binder.

The active material described in the first embodiment is used for the negative electrode active material. As the negative electrode active material, the active material described in the first embodiment may be used alone or in combination with other active materials. Examples of other active materials include titanium oxide compounds such as titanium dioxide having an anatase structure ($TiO_2$), titanium dioxide having a bronze structure ($TiO_2$), lithium titanate having a ramsdellite structure (e.g., $Li_2Ti_3O_7$), and lithium titanate having a spinel structure (e.g., $Li_4Ti_5O_{12}$). Since the titanium oxide compounds have a working potential close to that of the niobium titanium composite oxide contained in the active material according to the first embodiment and are easily mixed with and dispersed in the niobium titanium composite oxide, they can be suitably used.

The conductive agent is added to improve the current collection performance and suppress the contact resistance with the current collector. Examples of the conductive agent include carbonaceous material such as acetylene black, carbon black, and graphite.

The binder is added to fill gaps of the dispersed negative electrode active material and bind the active material to the conductive agent. Examples of the binder include polytetrafluoroethylene (PTFE), polyvinylidene fluoride (PVdF), fluorine-based rubber, and styrene butadiene rubber.

Preferably, blending rates of the active material, the conductive agent, and the binder in the negative electrode active material containing layer are 68 to 96 mass %, 2 to 30 mass %, and 2 to 30 mass %, respectively. If the amount of the conductive agent is set to 2 mass % or more, the current collection performance of the negative electrode active material containing layer can be improved. If the amount of the binder is set to 2 mass % or more, the binding property of the negative electrode active material containing layer and the current collector is sufficient and excellent cycle characteristics can be expected. On the other hand, the amounts of the conductive agent and the binder are preferably set to 30 mass % or less from the viewpoint of high capacity performance.

A material which is electrochemically stable at the lithium absorption and release potential of the negative electrode active material is used for the current collector. The current collector is preferably formed of copper, nickel, stainless steel or aluminium, or an aluminium alloy containing at least one element selected from the group consisting of Mg, Ti, Zn, Mn, Fe, Cu, and Si. The thickness of the current collector is preferably from 5 to 20 μm. The current collector having such a thickness can achieve a negative electrode that is strong and lightweight.

The negative electrode may be produced by a method comprising suspending the negative active material, the binder, and the conductive agent in a solvent to prepare a slurry, applying the slurry to the negative electrode current collector, drying to form a negative electrode active material containing layer, and pressing it. The negative electrode may also be produced by forming a pellet comprising the active material, the binder, and the conductive agent to produce a negative electrode active material containing layer and placing the layer on the current collector.

2) Positive Electrode

The positive electrode includes a current collector and a positive electrode active material containing layer (positive electrode material layer). The positive active material containing layer is formed on one side or both sides of the current collector. The layer includes the positive active material and arbitrarily includes the conductive agent and the binder.

Usable examples of the active material include oxides, sulfides, and polymers. Examples of the oxides and sulfides include manganese dioxide capable of absorbing lithium ($MnO_2$), iron oxide, copper oxide, nickel oxide, a lithium manganese composite oxide (e.g., $Li_xMn_2O_4$ or $Li_xMnO_2$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium-manganese-nickel composite oxide having a spinel structure (e.g., $LixMn_{2-y}Ni_yO_4$), a lithium phosphorus oxide having an olivine structure (e.g., $Li_xFePO_4$, $Li_xFe_{1-y}Mn_yPO_4$, $Li_xCoPO_4$), iron sulfate [$Fe_2(SO_4)_3$], a vanadium oxide (e.g., $V_2O_5$), and a lithium nickel cobalt manganese composite oxide. In the above formula, x is more than 0 and 1 or less and y is more than 0 and 1 or less.

As the polymer, for example, conductive polymer materials such as polyaniline and polypyrrole, or disulfide-based polymer materials can be used. Sulfur (S) and carbon fluoride can also be used as the active material.

Examples of a more preferred active material include a lithium manganese composite oxide (e.g., $Li_xMn_2O_4$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium-manganese-nickel composite oxide having a spinel structure (e.g., $Li_xMn_{2-y}Ni_yO_4$), a lithium manganese cobalt composite oxide (e.g., $Li_xMn_yCo_{1-y}O_2$), lithium iron phosphate (e.g., $Li_xFePO_4$), and a lithium nickel cobalt manganese composite oxide. In the above formula, x is more than 0 and 1 or less and y is more than 0 and 1 or less. These active materials enable a high positive electrode potential to be obtained.

When a nonaqueous electrolyte containing room temperature molten salt is used, it is preferable to use lithium iron phosphate, $li_xVPO_4F$, a lithium manganese composite oxide, a lithium nickel composite oxide, and a lithium nickel cobalt composite oxide from the viewpoint of cycle life. This is because the reactivity of the positive electrode active material with room temperature molten salt is decreased.

The kind of the active material may be one kind or two kinds or more.

The specific surface area of the active material is preferably from 0.1 $m^2/g$ to 10 $m^2/g$. In the case of the positive electrode active material having a specific surface area of 0.1 $m^2/g$ or more, the absorption and release site of lithium ions can be sufficiently ensured. In the case of the positive electrode active material having a specific surface area of 10 $m^2/g$ or less, the handling in the industrial production is made easy and a good charge discharge cycle performance can be ensured.

The binder is used to bind the conductive agent to the active material. Examples of the binder include polytetrafluoroethylene (PTFE), polyvinylidene fluoride (PVdF), and fluorine-based rubber. The conductive agent is added, if necessary, to improve the current collection performance and suppress the contact resistance with the collector. Examples of the conductive agent include carbonaceous material such as acetylene black, carbon black, and graphite.

In the positive electrode active material containing layer, the active material and binder are preferably contained in a ratio of 80% by mass or more and 98% by mass or less and in a ratio of 2% by mass or more and 20% by mass or less, respectively. When the amount of the binder is 2% by mass or more, sufficient electrode strength is obtained. Further, when the amount of the binder is 20% by mass or less, the amount of the insulating material of the electrode can be reduced, leading to reduced internal resistance. When the conductive agent is added, the active material, binder, and conductive agent are added in amounts of 77% by mass or more and 95% by mass or less, 2% by mass or more and 20% by mass or less and 37% by mass or more and 15% by mass or less, respectively. When the amount of the conductive agent is 3% by mass or more, the above effect can be exerted. Further, when the amount of the conductive agent is 15% by weight or less, the decomposition of the nonaqueous electrolyte on the surface of the positive electrode conductive agent during storage at high temperatures can be reduced.

The current collector is preferably an aluminum foil or an aluminum alloy foil containing at least one element selected from Mg, Ti, Zn, Ni, Cr, Mn, Fe, Cu, and Si.

The thickness of the aluminum foil or aluminum alloy foil is preferably 5 μm or more and 20 μm or less, more preferably 15 μm or less. The purity of the aluminum foil is preferably 99% by mass or more. The aluminum alloy foil and aluminum foil may contain at least one kind of transition metal selected from the group consisting of iron, copper, nickel, and chromium. The content of transition metal is set to, preferably 1% by mass or less.

The positive electrode may be produced by a method comprising suspending the active material, the binder, and the conductive agent to be added, if necessary in an appropriate solvent to prepare a slurry, applying the slurry to the positive electrode current collector, drying to form a positive electrode active material containing layer, and pressing it. The positive electrode may also be produced by forming a pellet comprising the active material, the binder, and the conductive agent to be added, if necessary, to produce a positive electrode active material containing layer, which is then placed on the collector.

3) Nonaqueous Electrolyte

The nonaqueous electrolyte may be, for example, a liquid nonaqueous electrolyte prepared by dissolving an electrolyte in an organic solvent or a gel-like nonaqueous electrolyte prepared by forming a composite of a liquid electrolyte and a polymer material. The liquid nonaqueous electrolyte is preferably one which is prepared by dissolving an electrolyte in an organic solvent at a concentration of 0.5 to 2.5 mol/L.

Examples of the electrolyte include a lithium salt such as lithium perchlorate ($LiClO_4$), lithium hexafluorophosphate ($LiPF_6$), lithium tetrafluoroborate ($LiBF_4$), arsenic lithium hexafluoride ($LiAsF_6$), lithium trifluoromethasulfonate ($LiCF_3SO_3$), lithium bis(trifluoromethylsulfonyl)imide [$LiN(CF_3SO_2)_2$], or mixtures thereof. The electrolyte is preferably one which is not easily oxidized even at a high potential and $LiPF_6$ is the most preferable.

Examples of the organic solvent include cyclic carbonates such as propylene carbonate (PC), ethylene carbonate (EC), or vinylene carbonate; linear carbonates such as diethyl carbonate (DEC), dimethyl carbonate (DMC), or methylethyl carbonate (MEC); cyclic ethers such as tetrahydrofuran (THF), 2-methyltetrahydrofuran (2MeTHF), or dioxolane (DOX); linear ethers such as dimethoxyethane (DME) or diethoxyethane (DEE); and γ-butyrolactone (GBL), acetonitrile (AN), and sulfolane (SL). These organic solvents can be used alone or as a mixed solvent.

Examples of the polymer material include polyvinylidene fluoride (PVdF), polyacrylonitrile (PAN), and polyethylene oxide (PEO).

Alternatively, a room temperature molten salt containing lithium ions (ionic melt), polymer solid electrolyte, inorganic solid electrolyte and the like may be used as the nonaqueous electrolyte.

The room temperature molten salt (ionic melt) means compounds which can exist in a liquid state at normal temperature (15 to 25° C.) among organic salts constituted of combinations of organic cations and anions. Examples of the room temperature molten salt include those which solely exist in a liquid state, those which are put into a liquid state when mixed with an electrolyte, and those which are put into a liquid state when dissolved in an organic solvent. The melting point of the room temperature molten salt to be usually used for the nonaqueous electrolyte battery is 25° C. or less. Further, the organic cation generally has a quaternary ammonium skeleton.

The polymer solid electrolyte is prepared by dissolving an electrolyte in a polymer material and by solidifying the mixture. The inorganic solid electrolyte is a solid material having lithium ion-conductivity.

4) Separator

The separator may be formed of a porous film containing a material such as polyethylene, polypropylene, cellulose or polyvinylidene fluoride (PVdF), or a synthetic resin nonwoven fabric. Particularly, a porous film containing polyethylene or polypropylene melts at a constant temperature and can block electric current, and thus it is preferred from the viewpoint of improvement in safety.

5) Case

As the case, a container formed of a laminate film having a thickness of 0.5 mm or less or a container formed of a metal having a thickness of 1 mm or less can be used. The thickness of the laminate film is more preferably 0.2 mm or less. The thickness of the metal container is preferably 0.5 mm or less, more preferably 0.2 mm or less.

The shape of the case may be flat-type (thin-type), square-type, cylindrical-type, coin-type, button-type or the like. The case may be, for example, a case for a small battery which is loaded into a portable electronic device or a case for a large battery which is loaded into a two- or four-wheeled vehicle depending on the size of the battery.

As the laminate film, a multilayer film in which a metal layer is provided interposed between resin layers is used. The metal layer is preferably aluminum foil or aluminum alloy foil in order to reduce the weight. Polymer materials such as polypropylene (PP), polyethylene (PE), nylon, or polyethylene terephthalate (PET) can be used for the resin layer. The laminate film can be formed into a shape of the case by heat sealing.

The metal container is formed from aluminium or an aluminium alloy. It is preferable that the aluminium alloy includes elements such as magnesium, zinc, or silicon. When transition metals such as iron, copper, nickel, and chromium are contained in the alloy, the content is preferably 100 ppm or less.

Figure 2:
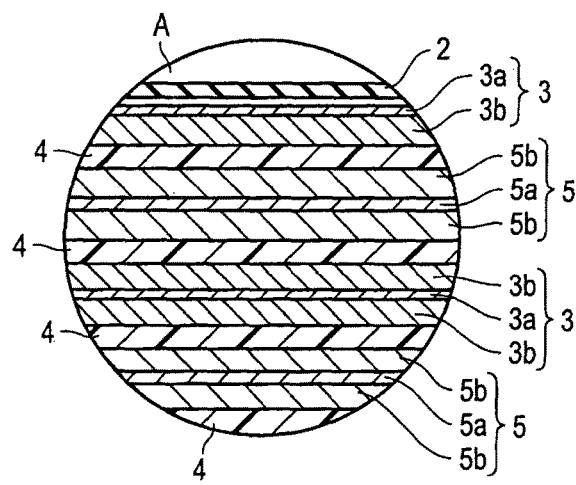
FIG. 2 is an enlarged sectional view of an A portion of FIG. 1.

The nonaqueous electrolyte battery according to the second embodiment will be more specifically described with reference to the drawings. FIG. 1 is a cross-sectional view of a flat-shaped nonaqueous electrolyte battery. FIG. 2 is an enlarged sectional view of a portion A of FIG. 2. Each drawing is a pattern diagram to facilitate an understanding of the embodiments. The shape, size, and ratio thereof are different from those of an actual device. However, they can be appropriately designed and modified by taking into consideration the following description and known techniques.

A flat-shaped wound electrode group 1 is housed in a bag-shaped case 2 formed of a laminate film in which a metal layer is interposed between two resin layers. As shown in FIG. 2, the flat-shaped wound electrode group 1 is formed by spirally winding a laminate obtained by stacking a negative electrode 3, a separator 4, a positive electrode 5, and the separator 4 in this order from the outside and subjecting it to press-molding.

The negative electrode 3 includes a negative electrode current collector 3a and a negative electrode active material containing layer 3b. The negative electrode active material is contained in the negative electrode active material containing layer 3b. As shown in FIG. 2, the negative electrode 3 on the outermost layer has a configuration in which the negative electrode active material containing layer 3b is formed at one inner surface of the negative electrode current collector 3a. In other negative electrodes 3, the negative electrode active material containing layer 3b is formed at both sides of the negative electrode current collector 3a. In the positive electrode 5, the positive electrode active material containing layer 5b is formed at both sides of the positive electrode current collector 5a.

As shown in FIG. 1, in a vicinity of a peripheral edge of the wound electrode group 1, a negative electrode terminal 6 is connected to the negative electrode current collector 3a of the negative electrode 3 of an outermost layer, and a positive electrode terminal 7 is connected to the positive electrode current collector 5a of the positive electrode 5 at the inside. The negative electrode terminal 6 and the positive electrode terminal 7 are extended outwardly from an opening of the bag-shaped case 2. For example, the liquid nonaqueous electrolyte is injected into the opening of the bag-shaped case 2. The wound electrode group 1 and the liquid nonaqueous electrolyte can be sealed by heat-sealing the opening of the bag-shaped case 2 across the negative electrode terminal 6 and the positive electrode terminal 7.

The negative electrode terminal is formed from a material which is electrically stable in Li absorption-release potential of the negative electrode active material and has conductivity. Specific examples thereof include copper, nickel, stainless steel, aluminium, and an aluminium alloy containing at least one element selected from the group consisting of Mg, Ti, Zn, Mn, Fe, Cu, and Si. It is preferable that the negative electrode terminal is formed from the same material as that of the negative electrode current collector in order to reduce the contact resistance with the negative electrode current collector.

The positive electrode terminal is preferably formed of a material having electric stability and conductivity in a potential range (3 V to 5 V, preferably 3 to 4.25) to lithium ion metal. Specific examples thereof include aluminum and an aluminum alloy containing at least one element selected from the group consisting of Mg, Ti, Zn, Ni, Cr, Mn, Fe, Cu, and Si. It is preferable that the positive electrode terminal is formed from the same material as that of the positive electrode current collector in order to reduce the contact resistance with the positive electrode current collector.

Figure 3:
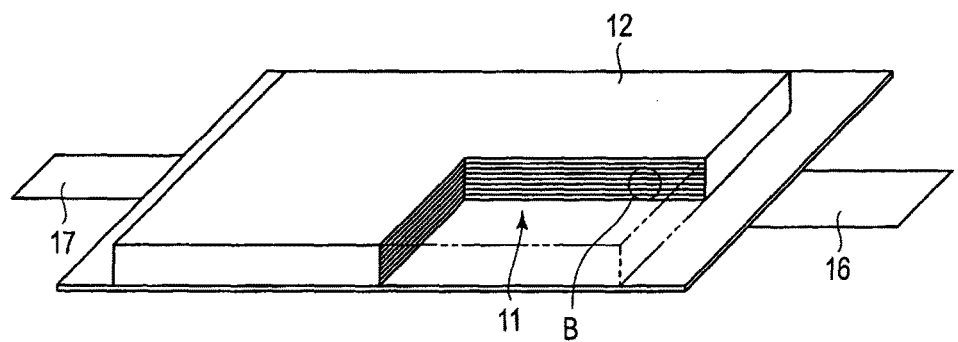
FIG. 3 is a partial cutaway perspective view schematically showing another flat-shaped nonaqueous electrolyte battery according to the first embodiment.
Figure 4:
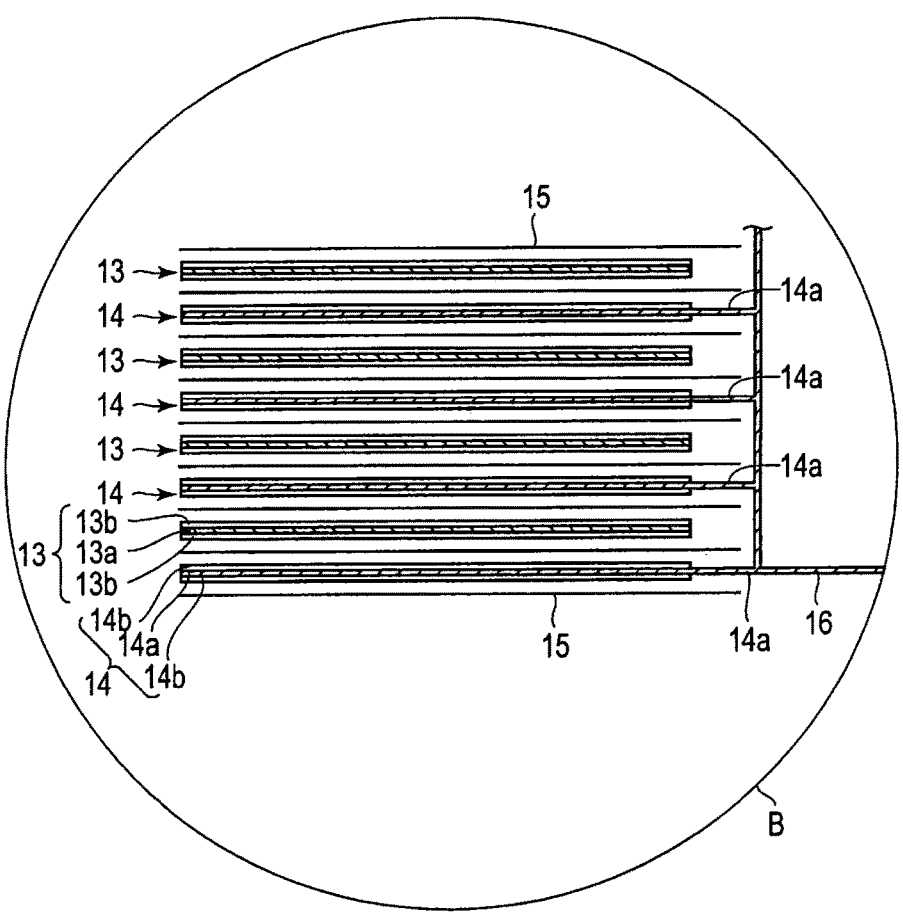
FIG. 4 is an enlarged sectional view of a B portion of FIG. 3.

The nonaqueous electrolyte battery according to the second embodiment may have not only the configurations shown in FIGS. 1 and 2, but also the configurations shown in FIGS. 3 and 4. FIG. 3 is a partial cutaway perspective view schematically showing another flat-shaped nonaqueous electrolyte battery according to the second embodiment. FIG. 4 is an enlarged sectional view of a B portion of FIG. 3.

The lamination-type electrode group 11 is housed in a case 12 which is formed of a laminate film in which a metal layer is interposed between two resin films. As shown in FIG. 4, the lamination-type electrode group 11 has a structure in which a positive electrode 13 and a negative electrode 14 are alternately stacked while a separator 15 is interposed between the both electrodes. A plurality of the positive electrodes 13 are present and they comprise the current collector 13a and a positive electrode active material containing layer 13b formed at both sides of the current collector 13a. A plurality of the negative electrodes 14 are present and they comprise a negative electrode current collector 14a and a negative electrode active material containing layer 14b formed at both sides of the negative electrode current collector 14a. In each of the negative electrode current collectors 14a of the negative electrodes 14, a side is protruded from the negative electrode 14. The protruded negative electrode current collector 14a is electrically connected to a belt-like negative electrode terminal 16. The distal end of the negative electrode terminal 16 is externally drawn from the case 11. In the positive electrode current collector 13a of the positive electrode 13, not illustrated, the side located at the opposite side of the protruded side of the negative electrode current collector 14a is protruded from the positive electrode 13. The positive electrode current collector 13a protruded from the positive electrode 13 is electrically connected to a belt-like positive electrode terminal 17. The distal end of the belt-like positive electrode terminal 17 is located at the opposite side of the negative electrode terminal 16 and externally drawn from the case 11.

According to the nonaqueous electrolyte battery according to the second embodiment, the capacity and rate performance can be improved because the negative electrode containing the active material according to the first embodiment is included.

Third Embodiment

Subsequently, a battery pack according to a third embodiment will be described with reference to the drawings. The battery pack according to the third embodiment includes one or a plurality of nonaqueous electrolyte batteries (unit cells) according to the second embodiment. When a plurality of the unit cells are included, each of the unit cells is electrically connected in series or in parallel.

Figure 5:
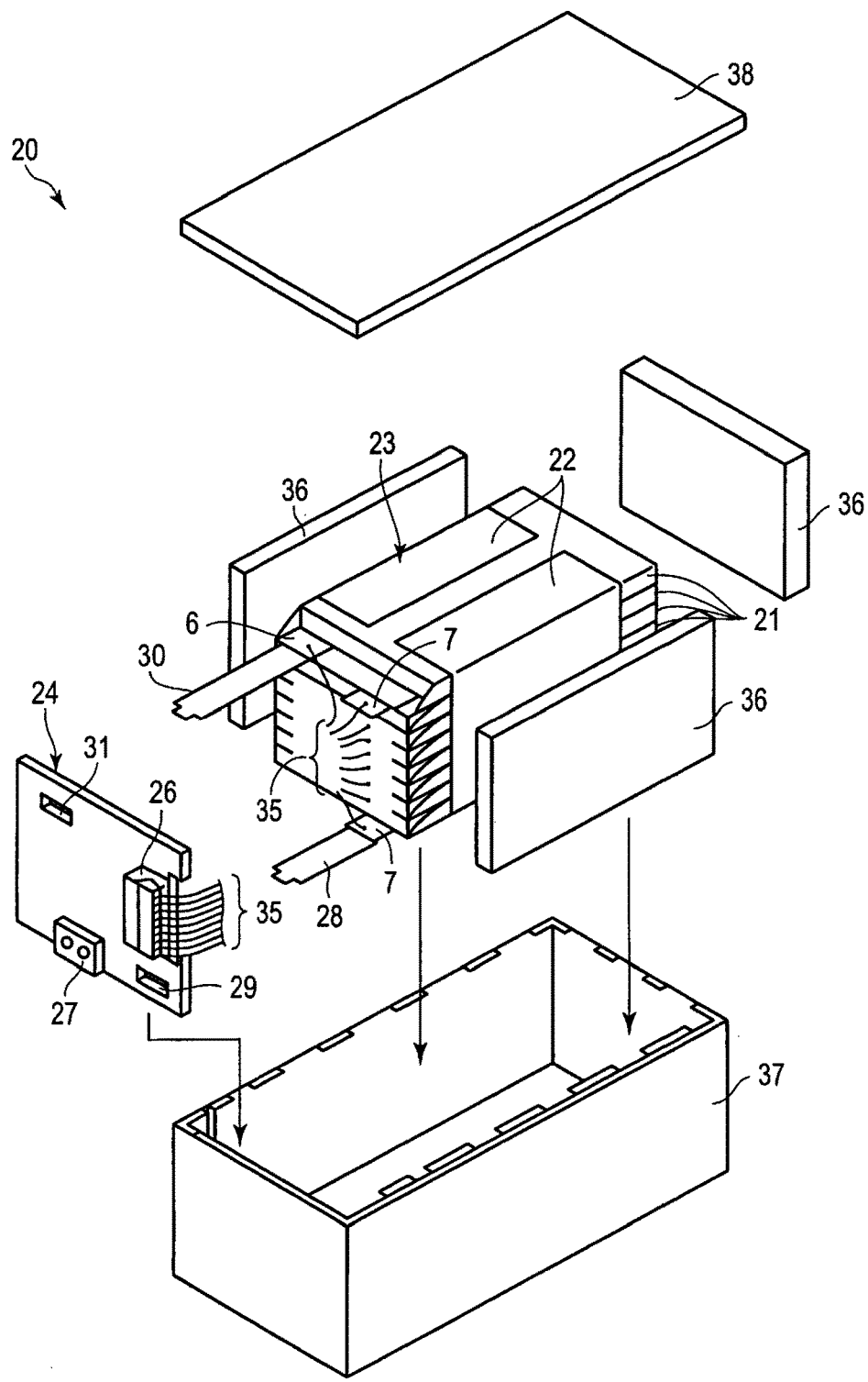
FIG. 5 is an exploded perspective view of a battery pack according to a second embodiment.

FIG. 5 and FIG. 6 show an example of a battery pack 20. The battery pack 20 includes a plurality of flat-type batteries 21 having the structure shown in FIG. 1. FIG. 5 is an exploded perspective view of the battery pack 20. FIG. 6 is a block diagram showing an electric circuit of the battery pack 20 of FIG. 5.

A battery module 23 is configured by stacking the unit cells 21 so that a negative electrode terminal 6 extended outside and a positive electrode terminal 7 are arranged in the same direction and fastening them with an adhesive tape 22. The unit cells 21 are electrically connected in series as shown in FIG. 6.

A printed wiring board 24 is arranged opposed to the side plane of the unit cells 21 where the negative electrode terminal 6 and the positive electrode terminal 7 are extended. A thermistor 25, a protective circuit 26, and an energizing terminal 27 to an external instrument are mounted on the printed wiring board 24 as shown in FIG. 6. An electric insulating plate (not shown) is attached to the plane of the printed wiring board 24 facing the battery module 23 to avoid unnecessary connection of the wiring of the battery module 23.

A positive electrode lead 28 is connected to the positive electrode terminal 7 located at the bottom layer of the battery module 23 and the distal end is inserted into a positive electrode connector 29 of the printed wiring board 24 so as to be electrically connected. A negative electrode lead 30 is connected to the negative electrode terminal 6 located at the top layer of the battery module 23 and the distal end is inserted into a negative electrode connector 31 of the printed wiring board 24 so as to be electrically connected. The connectors 29 and 31 are connected to the protective circuit 26 through wirings 32 and 33 on the printed wiring board 24.

The thermistor 25 detects the temperature of the unit cells 21 and the detection signal is sent to the protective circuit 26. The protective circuit 26 can shut down a plus-side wiring 34a and a minus-side wiring 34b between the protective circuit 26 and the energizing terminals 27 energizing terminal 27 to an external instrument under a predetermined condition. For example, the predetermined condition is when the detection temperature of the thermistor 25 becomes more than a predetermined temperature. Or, the predetermined condition is when the overcharge, overdischarge, or over-current of the unit cells 21 are detected. The overcharge detection may be performed on each of the unit cells 21 or the battery module 23. When each of the unit cells 21 is detected, the cell voltage may be detected, or a positive electrode or negative electrode potential may be detected. In the case of the latter, a lithium electrode to be used as a reference electrode is inserted into each of the unit cells 21. In the case of FIGS. 5 and 6, wirings 35 for voltage detection are connected to the unit cells 21 and detection signals are sent to the protective circuit 26 through the wirings 35.

Protective sheets 36 comprised of rubber or resin are arranged on three side planes of the battery module 23 except the side plane in which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal planes in a long side direction of the housing container 37 and on one of the internal planes in a short side direction. The printed wiring board 24 is arranged on the other internal plane in a short side direction. The battery module 23 is located in a space surrounded by the protective sheets 36 and the printed wiring board 24. A lid 38 is attached to the upper plane of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tube, and thermally shrinking the heat-shrinkable tube.

In FIGS. 5 and 6, the form in which the unit cells 21 are connected in series is shown. However, in order to increase the battery capacity, the cells may be connected in parallel. Alternatively, the cells may be formed by combining series connection and parallel connection. The battery module pack can be connected in series or in parallel.

The embodiment of the battery pack is appropriately changed according to the use. The battery pack is used suitably for the application which requires the excellent cycle characteristics at a high current. It is used specifically as a power source for digital cameras, for vehicles such as two- or four-wheel hybrid electric vehicles, for two- or four-wheel electric vehicles, and for assisted bicycles. Particularly, it is suitably used as a battery for automobile use.

According to the third embodiment, since the nonaqueous electrolyte battery of the second embodiment is included, there can be provided a battery pack having a high capacity and excellent rate performance.

EXAMPLES

Hereinafter, Examples will be described.

Example 1

A niobium titanium composite oxide was synthesized by a solid reaction method. In order to obtain an Nb rich phase, $Nb_2O_5$ particles having an average particle diameter of 0.7 μm and $TiO_2$ particles having an average particle diameter of 4.5 μm were used as starting materials. As the average particle diameters of $Nb_2O_5$ particles and $TiO_2$ particles, particle diameters when the volume frequency measured with a laser diffraction and scattering-type particle size distribution measuring device (Microtrac MT33-EXII, Nikkiso Co., Ltd.) was 50% were used.

Thus, when there is a difference in particle diameter between $Nb_2O_5$ particles and $TiO_2$ particles, atomic diffusion during sintering by the solid phase method is not sufficiently activated. Thus, it is possible to intentionally form Nb-rich phases such as $Nb_{10}Ti_2O_{29}$ and $Nb_{24}TiO_{62}$ or a $TiO_2$ rutile phase. $Nb_2O_5$ particles and $TiO_2$ particles were mixed at a molar ratio of 1:1, and ground in a dry-type ball mill. The obtained powder was put into an alumina crucible and temporarily sintered at 1000° C. for 12 hours (the first sintering). After the temporarily sintering, the powder was pelletized and put into a platinum crucible, followed by sintering at 1350° C. for 18 hours (second sintering). After the sintering, the resultant product was ground and mixed in an agate mortar. The mixture was passed through a screen having meshes of 25 μm to remove coarse particles. The obtained particles were used as an active material powder. The average composition of the obtained active material powder was $Nb_{2+x}Ti_{1-x}O_{7+0.5x}$ (x is 0). The active material powder was measured by the wide-angle X-ray diffraction under the conditions: sampling interval; 0.01° and scanning speed; 2°/min. The measurement results are shown in FIG. 7. As shown in FIG. 7, in the diffraction pattern by the wide-angle X-ray diffraction method, the peak A appeared at 2θ of 26.04°, the peak B appeared at 2θ of 24.99°, the peak C appeared at 2θ of 24.78°, and the peak D appeared at 2θ of 27.40°. Peak intensity ratios (B/A), (C/A), and (D/A) are shown in Table 1 below.

To prepare a slurry; 100 mass % of the obtained niobium titanium composite oxide powder, 10 mass % of acetylene black and 5 mass % of carbon nanofiber were added as conductive auxiliary agents, and 10 mass % of polyvinylidene fluoride (PVdF) as a binder were added to N-methyl pyrrolidone (NMP), and mixed. This slurry was applied to one side of a current collector formed of 12-μm-thick aluminum foil and dried, followed by pressing to produce an electrode having an electrode density of 2.2 g/cm³.

An amount of 1 mol/L of $LiPF_6$ supporting salt was dissolved in a mixed solvent obtained by mixing ethylene carbonate (EC) and diethyl carbonate (DEC) at a volume ratio of 1:2 to prepare an electrolyte solution. The obtained electrode was used as the working electrode. Li metal was used as the counter electrode and the reference electrode. A three-electrode-type beaker cell using the electrolyte solution was produced, and then the charge and discharge characteristics were evaluated.

Example 2

An active material comprised of a niobium titanium composite oxide was synthesized similarly to Example 1 except that the sintering was performed at 1350° C. for 18 hours, followed by annealing at 600° C. for 24 hours. Then, the charge and discharge characteristics were evaluated. The purpose of the annealing is to reduce the Nb-rich phase as much as possible and prove the observed effect under the small amount of the Nb-rich phase.

The average composition of the active material powder of Example 2 was $Nb_{2+x}Ti_{1-x}O_{7+0.5x}$ (x is 0). The active material powder was measured by the wide-angle X-ray diffraction under the conditions: sampling interval; 0.01° and scanning speed; 2°/min. The measurement results are shown in FIG. 8. As shown in FIG. 8, in the diffraction pattern by the wide-angle X-ray diffraction method, the peak A appeared at 2θ of 25.97°, the peak B appeared at 2θ of 24.91°, the peak C appeared at 2θ of 24.76°, and the peak D appeared at 2θ of 27.32°. Peak intensity ratios (B/A), (C/A), and (D/A) are shown in Table 1 below.

Example 3

An active material comprised of a niobium titanium composite oxide was synthesized similarly to Example 1 except that the sintering was performed at 1350° C. for 18 hours, the temperature was decreased to 1000° C., and a sample was taken out from a sintering furnace and transferred to a normal temperature environment to rapidly cool it. Then, the charge and discharge characteristics were evaluated. The purpose of the rapid cooling is to examine the effect in a state where the content ratio of the Nb-rich phase is high.

The average composition of the active material powder of Example 3 was $Nb_{2+x}Ti_{1-x}O_{7+0.5x}$ (x is 0). The active material powder was measured by the wide-angle X-ray diffraction under the conditions: sampling interval; 0.01° and scanning speed; 2°/min. The measurement results are shown in FIG. 9. As shown in FIG. 9, in the diffraction pattern by the wide-angle X-ray diffraction method, the peak A appeared at 2θ of 26.03°, the peak B appeared at 2θ of 24.97°, the peak C appeared at 2θ of 24.73°, and the peak D appeared at 2θ of 27.36°. Peak intensity ratios (B/A), (C/A), and (D/A) are shown in Table 1 below.

Comparative Example 1

An active material comprised of a niobium titanium composite oxide was synthesized similarly to Example 1 except that the particle diameter of $TiO_2$ as a starting material was 3.3 μm, and the sintering temperature and time were changed to 1100° C. and 12 hours, respectively. Then, the charge and discharge characteristics were evaluated.

The average composition of the active material powder of Comparative example 1 was $Nb_{2+x}Ti_{1-x}O_{7+0.5x}$ (x is 0). The active material powder was measured by the wide-angle X-ray diffraction under the conditions: sampling interval; 0.01° and scanning speed; 2°/min. The measurement results are shown in FIG. 10. As shown in FIG. 10, in the diffraction pattern by the wide-angle X-ray diffraction method, the peak A appeared at 2θ of 26.04°, but the peaks B, C, and D did not appear.

Comparative Example 2

Commercially available oxide reagents $Nb_2O_5$ and $TiO_2$ were used. These powders were weighed so as to have a molar ratio of 1:1 and mixed in a mortar. Next, the resultant mixture was introduced into an electric furnace and sintered at 1250° C. for a total of 20 hours to synthesize $TiNb_2O_7$. The synthesis method used herein is based on the method described in Non Patent Literature 1.

Figure 11:
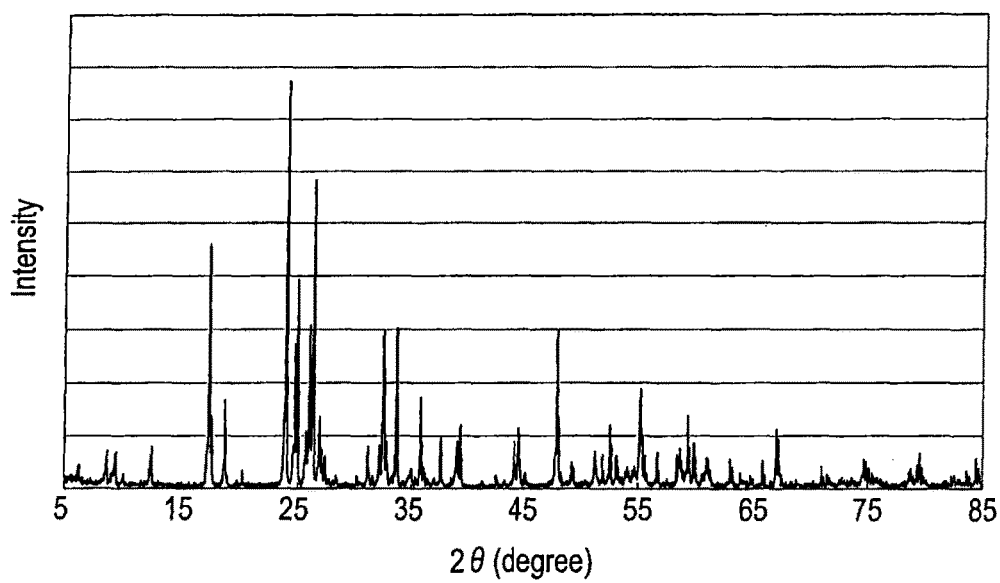
FIG. 11 shows an X-ray diffraction pattern of a niobium titanium composite oxide of Comparative example 2.

The active material powder of Comparative example 2 was measured by the wide-angle X-ray diffraction under the conditions: sampling interval; 0.01° and scanning speed; 2°/min. The measurement results are shown in FIG. 11. As shown in FIG. 11, in the diffraction pattern by the wide-angle X-ray diffraction method, a main peak appeared at 2θ of 23.97° and the peak A did not appear.

In the examples and the comparative examples, the evaluation temperature was set to 25° C., the cutoff potential during charge was set to 3.0 V, and the cutoff potential during discharge was set to 1.0 V. After the first cycle charge and discharge at 0.2 C, the discharge capacity at 0.2 C, the discharge capacity at 5 C, and the discharge capacity at 30 C were measured. The ratios (%) of the discharge capacities to the discharge capacity at 2 C are described in Table 1.

TABLE 1

|  | Peak intensity ratio (B/A) | Peak intensity ratio (C/A) | Peak intensity ratio (D/A) | Discharge capacity at 0.2 C (mAh/g) | Ratio (%) of discharge capacity at 5 C to first cycle discharge capacity at 0.2 C | Ratio (%) of discharge capacity at 30 C to first cycle discharge capacity at 0.2 C |
| --- | --- | --- | --- | --- | --- | --- |
| Example 1 | 0.35 | 0.14 | 0.01 | 255.1 | 99.1 | 84.8 |
| Example 2 | 0.10 | 0.02 | 0.01 | 248.2 | 99.8 | 80 |
| Example 3 | 0.57 | 0.05 | 0.025 | 237.3 | 99.2 | 83.5 |
| Comparative Example 1 | No peak | No peak | No peak | 279.6 | 92.3 | 72.2 |
| Comparative Example 2 | — | — | — | 261.0 | 92.1 | 75 |

As is clear from Table 1, it is found that, according to Examples 1 to 3, the discharge capacity at 30 C to the first cycle discharge capacity at 0.2 C is high as compared with Comparative examples 1 and 2 and the rate performance is excellent. On the other hand, it is found that the active material comprised of a single phase of $Nb_2TiO_7$ in Comparative example 1 is poor in rate performance as compared with Examples 1 to 3. Comparative example 2, where the sintering temperature is low, is poor in rate performance. The active material of Comparative example 2 was synthesized by sintering at a low temperature of 1250° C. Thus, as shown in FIG. 11, the main peak is present at near 24°. On the other hand, in the cases of the active materials of Examples 1 to 3, the peak A as a main peak appears at near 26.0° as shown in FIGS. 7 to 9. The X-ray diffraction patterns shown in FIGS. 7 to 9 suggest that the crystallites are anisotropically grown by sintering at a high temperature of 1350° C. As a result, a binding interface between the Nb-rich phase and the $Nb_2TiO_7$ phase is formed smoothly.

According to the active materials of these embodiments or the examples, it is possible to obtain an active material having a high capacity and excellent lithium absorption and release characteristics because each of the active materials contains a niobium titanium composite oxide whose average composition is represented by $Li_yNb_{2+x}Ti_{1-x}O_{7+0.5x}$ (0≤x≤0.5, 0≤y≤5.5) and which satisfies peak intensity ratios represented by the formulae (1) to (3). According to the nonaqueous electrolyte battery produced by using the active material, it is possible to realize a high capacity and excellent rate performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a niobium titanium composite oxide whose average composition is represented by $Li_yNb_{2+x}Ti_{1-x}O_{7+0.5x}$ (0≤x≤0.5, 0≤y≤5.5) and which satisfies peak intensity ratios represented by the following formulae (1) to (3):

$$0.05 \leq (B/A) \leq 0.7 \quad (1)$$

$$0.01 \leq (C/A) \leq 0.2 \quad (2)$$

$$0 \leq (D/A) \leq 0.1 \quad (3)$$

wherein A is an intensity of a peak derived from $Nb_2TiO_7$ at 2θ of 26.0±0.1° in a wide angle X-ray diffraction pattern using CuKα rays as an X-ray source, B is an intensity of a peak derived from $Nb_{10}Ti_2O_{29}$ at 2θ of 25.0±0.1° in the wide angle X-ray diffraction pattern, C is an intensity of a peak derived from $Nb_{24}TiO_{62}$ at 2θ of 24.8±0.1° in the wide angle X-ray diffraction pattern, and D is an intensity of a peak derived from a $TiO_2$ rutile phase at 2θ of 27.4±0.2° in the wide angle X-ray diffraction pattern.

2. The active material according to claim 1, wherein the peak intensity ratio (D/A) satisfies 0<(D/A)≤0.1.

3. The active material according to claim 1, wherein the peak intensity ratio (B/A) satisfies 0.06≤(B/A)≤0.5.

4. The active material according to claim 1, wherein the peak intensity ratio (C/A) satisfies 0.01≤(C/A)≤0.1.

5. A nonaqueous electrolyte battery comprising:
a positive electrode;
a negative electrode containing the active material according to claim 1; and
a nonaqueous electrolyte.

6. A battery pack comprising the nonaqueous electrolyte battery according to claim 5.

7. A method of producing the active material of claim 1, comprising:
first sintering a mixture comprising $TiO_2$ particles and $Nb_2O_5$ particles at 600° C. to 1100° C., wherein the $Nb_2O_5$ particles have an average particle diameter smaller than an average particle diameter of the $TiO_2$ particles, to produce a first sintered mixture; and
second sintering the first sintered mixture at 1300° C. to 1400° C. to obtain oxide.

8. The method according to claim 7, further comprising annealing the oxide at 600° C. to 1000° C. after the second sintering.

9. The method according to claim 7, further comprising cooling the oxide after the second sintering.

10. The active material according to claim 1, wherein:
the peak intensity ratio (D/A) satisfies 0<(D/A)≤0.1;
the peak intensity ratio (B/A) satisfies 0.06≤(B/A)≤0.5; and
the peak intensity ratio (C/A) satisfies 0.01≤(C/A)≤0.1.

11. The active material according to claim 1, wherein the peak intensity ratio (D/A) satisfies 0.005≤(D/A)≤0.1.

12. The active material according to claim 1, wherein the peak intensity ratio (B/A) satisfies 0.05≤(B/A)≤0.5.

13. The active material according to claim 1, wherein the niobium titanium composite oxide comprises phases having different composition ratios of Nb/Ti each other.

14. The active material according to claim 1, wherein the niobium titanium composite oxide comprises a phase of $Nb_2TiO_7$, a niobium titanium composite oxide phase having a different composition ratio of Nb/Ti from the phase of $Nb_2TiO_7$ and a $TiO_2$ rutile phase.

15. The active material according to claim 14, wherein the niobium titanium composite oxide phase comprises a phase of $Nb_{10}Ti_2O_{29}$ or a phase of $Nb_{24}TiO_{62}$.

16. The active material according to claim 1, further comprising titanium oxide compounds.

17. The active material according to claim 16, wherein the titanium oxide compounds comprise at least one compound selected from a group consisting of titanium dioxide having an anatase structure, titanium dioxide having a bronze structure, lithium titanate having a ramsdellite structure, and lithium titanate having a spinel structure.

18. The active material according to claim 1, wherein the active material is made by a method comprising:
   first sintering a mixture comprising $TiO_2$ particles and $Nb_2O_5$ particles at 600° C. to 1100° C., wherein the $Nb_2O_5$ particles have an average particle diameter smaller than an average particle diameter of the $TiO_2$ particles, to produce a first sintered mixture; and
   second sintering the first sintered mixture at 1300° C. to 1400° C. to obtain oxide.

19. The active material according to claim 18, wherein an average particle diameter of the $Nb_2O_5$ particles is 1 μm or less and an average particle diameter of the $TiO_2$ particles is 4 μm or more.

20. The active material according to claim 1, wherein:
   the peak intensity ratio (D/A) satisfies $0.005 \leq (D/A) \leq 0.025$;
   the peak intensity ratio (B/A) satisfies $0.05 \leq (B/A) \leq 0.57$; and
   the peak intensity ratio (C/A) satisfies $0.01 \leq (C/A) \leq 0.14$.

* * * * *